(12) United States Patent
Xie

(10) Patent No.: US 12,417,433 B2
(45) Date of Patent: Sep. 16, 2025

(54) WAREHOUSING DATA PROCESSING METHOD AND APPARATUS, MEDIUM, AND ELECTRONIC DEVICE

(71) Applicants: BEIJING JINGDONG CENTURY TRADING CO., LTD., Beijing (CN); BEIJING WODONG TIANJUN INFORMATION TECHNOLOGY CO., LTD., Beijing (CN)

(72) Inventor: Gaochun Xie, Beijing (CN)

(73) Assignees: Beijing Wodong Tianjun Information Technology Co., Ltd., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 290 days.

(21) Appl. No.: 18/043,058

(22) PCT Filed: Apr. 30, 2021

(86) PCT No.: PCT/CN2021/091640
§ 371 (c)(1),
(2) Date: Feb. 27, 2023

(87) PCT Pub. No.: WO2022/062412
PCT Pub. Date: Mar. 31, 2022

(65) Prior Publication Data
US 2024/0020633 A1    Jan. 18, 2024

(30) Foreign Application Priority Data

Sep. 27, 2020    (CN) .......................... 202011032679.4

(51) Int. Cl.
*G06Q 10/00*    (2023.01)
*G06Q 10/087*    (2023.01)
(52) U.S. Cl.
CPC ................................. *G06Q 10/087* (2013.01)

(58) Field of Classification Search
CPC .............. G06Q 10/087; G06Q 10/0875; G06F 16/2282
See application file for complete search history.

(56) References Cited

U.S. PATENT DOCUMENTS 10,872,309 B2 * 12/2020 Surendra ............... G06Q 10/067
2002/0072988 A1 *  6/2002 Aram ................. G06Q 30/0601
705/26.1

(Continued)

FOREIGN PATENT DOCUMENTS

CN    106971249 A    7/2017
CN    107256473 A    10/2017

(Continued)

OTHER PUBLICATIONS

International Search Report dated Jul. 27, 2021 of PCT International Application No. PCT/CN2021/091640.

(Continued)

*Primary Examiner* — Rokib Masud
(74) *Attorney, Agent, or Firm* — Qinghong Xu

(57) ABSTRACT

A method for processing warehousing data includes: obtaining attribute data of a preset object from a warehousing data table; determining safety inventory data of the preset object and target inventory data of the preset object according to the attribute data of the preset object; obtaining current inventory data of the preset object from the warehousing data table; determining, in response to that the current inventory data of the preset object is less than or equal to the safety inventory data of the preset object, a replenishment quantity of the preset object according to the target inventory data of the preset object and the current inventory data of the preset object; and sending the replenishment quantity of the preset object to a warehouse management system, causing the warehouse management system to perform replenish- (Continued)

ment according to the replenishment quantity of the preset object.

7 Claims, 7 Drawing Sheets

(56) References Cited

U.S. PATENT DOCUMENTS

| | | | |
|---|---|---|---|
| 2006/0069598 A1* | 3/2006 | Schweitzer | G06Q 10/06315 705/7.31 |
| 2018/0268368 A1 | 9/2018 | Chen et al. | |

FOREIGN PATENT DOCUMENTS

| | | | |
|---|---|---|---|
| CN | 107767203 | A | 3/2018 |
| CN | 108269045 | A | 7/2018 |
| CN | 109272265 | A | 1/2019 |
| CN | 109285246 | A | 1/2019 |
| CN | 109840734 | A | 6/2019 |
| CN | 109993516 | A | 7/2019 |
| CN | 110020817 | A | 7/2019 |
| CN | 110689159 | A | 1/2020 |
| CN | 111429048 | A | 7/2020 |
| JP | 2000348016 | A | 12/2000 |
| JP | 2003216216 | A | 7/2003 |
| JP | 2007200185 | A | 8/2007 |

OTHER PUBLICATIONS

Extended European Search Report dated Jul. 23, 2024 of European Application No. 21870800.6.
Decision of Rejection dated Sep. 19, 2024 of Chinese Application No. 202011032679.4.
2nd Office Action dated Aug. 22, 2023 for Japanese Application No. 2022-569256.
1st Office Action dated Feb. 4, 2024 for Chinese Application No. 202011032679.4.

* cited by examiner

WAREHOUSING DATA PROCESSING METHOD AND APPARATUS, MEDIUM, AND ELECTRONIC DEVICE

CROSS REFERENCE TO RELATED APPLICATION

This application is a National Stage of International Application No. PCT/CN2021/091640, filed on Apr. 30, 2021, which claims the priority of Chinese Application No. 202011032679.4, filed on Sep. 27, 2020, both of which are incorporated by reference herein in its entireties for all purposes.

TECHNICAL FIELD

This disclosure relates to the technical field of warehousing data processing and, in particular, to a method, an apparatus, a medium and an electronic device for processing warehousing data.

BACKGROUND

Nowadays in the warehouse management system, the replenishment timing and replenishment quantity of preset object are determined based on manual experience. For example, when restocking preset object in stores, manual experience may be used to predict the sales volume of preset object, inventory data of preset object and other parameters, and an auxiliary orderer can make decisions based on manually preset parameters. However, since the parameters involved in determining the replenishment timing and replenishment quantity of preset object are relatively complex, the determination of the replenishment timing and replenishment quantity of preset object based on merely the parameters determined by manual experience may result in lower accuracy and more time consuming for the warehouse management system.

It should be noted that the information disclosed in the above background section is only for enhancing understanding of the background of this disclosure, and therefore may contain information that does not form the prior art known to those skilled in the art.

SUMMARY

Embodiments of this disclosure are directed to provide a method, an apparatus, a medium and an electronic device for processing warehousing data.

Other features and advantages of this disclosure will become apparent from the following detailed description, or be learned in part by practice of this disclosure.

According to a first aspect of the embodiments of this disclosure, there is provided a method for processing warehousing data, including: obtaining, by a server, attribute data of a preset object from a warehousing data table; determining, by the server, safety inventory data of the preset object according to the attribute data of the preset object; determining, by the server, target inventory data of the preset object according to the attribute data of the preset object; obtaining, by the server, current inventory data of the preset object from the warehousing data table; determining, by the server when the current inventory data of the preset object is less than or equal to the safety inventory data of the preset object, a replenishment quantity of the preset object according to the target inventory data of the preset object and the current inventory data of the preset object; and sending, by the server, the replenishment quantity of the preset object to a warehouse management system, causing the warehouse management system to perform replenishment according to the replenishment quantity of the preset object.

In some embodiments of the disclosure, the attribute data of the preset object includes any one or more of following items: an arrival time length for the replenishment of the preset object, a replenishment cycle of the preset object, average daily sales data of the preset object, number of days for preparation of the preset object, a display-on-shelf quantity of the preset object, and stocking inventory data of the preset object.

In some embodiments of the disclosure, the method further includes: obtaining, by the server, sales data of the preset object in a historical time period from the warehousing data table; and determining, by the server, the average daily sales data of the preset object according to the sales data of the preset object in the historical time period.

In some embodiments of the disclosure, the determining, by the server, the safety inventory data of the preset object according to the attribute data of the preset object includes: determining, by the server, sales data of the preset object in a first time period according to the arrival time length for the replenishment of the preset object, the replenishment cycle of the preset object, and the average daily sales data of the preset object, where the first time period is a sum of the arrival time length for the replenishment of the preset object and the replenishment cycle of the preset object; determining, by the server, the safety inventory data of the preset object according to the sales data of the preset object in the first time period, the arrival time length for the replenishment of the preset object, the average daily sales data of the preset object, the display-on-shelf quantity of the preset object, and the stocking inventory data of the preset object, where the safety inventory data of the preset object is a maximum safety inventory data of the preset object.

In some embodiments of the disclosure, the determining, by the server, the target inventory data of the preset object according to the attribute data of the preset object includes: determining, by the server, the target inventory data of the preset object according to the average daily sales data of the preset object, the arrival time length for the replenishment of the preset object, the replenishment cycle of the preset object, and the number of days for preparation of the preset object.

In some embodiments of the disclosure, the method further includes: obtaining, by the server, an adjusted replenishment quantity of the preset object by adjusting the replenishment quantity of the preset object according to a minimum order quantity of the preset object; where sending, by the server, the replenishment quantity of the preset object to the warehouse management system includes: sending, by the server, the adjusted replenishment quantity of the preset object to the warehouse management system.

In some embodiments of the disclosure, the method further includes: determining, by the server according to store information corresponding to the preset object, whether the store information is in a preset list; and stopping, by the server when the store information is in the preset list, sending the replenishment quantity of the preset object to the warehouse management system.

According to a second aspect of the embodiments of this disclosure, there is provided an apparatus for processing warehousing data, including: a first obtaining module, configured to obtain attribute data of a preset object; a first determining module, configured to determine safety inventory data of the preset object according to the attribute data of the preset object; a second determining module, configured to determine target inventory data of the preset object according to the attribute data of the preset object; a second obtaining module, configured to obtain current inventory data of the preset object; a third determining module, configured to determine, when the current inventory data of the preset object is less than or equal to the safety inventory data of the preset object, a replenishment quantity of the preset object according to the target inventory data of the preset object and the current inventory data of the preset object; and a sending module, configured to send the replenishment quantity of the preset object to a warehouse management system, causing the warehouse management system to perform replenishment according to the replenishment quantity of the preset object.

In some embodiments of the disclosure, the attribute data of the preset object includes any one or more of following items: an arrival time length for the replenishment of the preset object, a replenishment cycle of the preset object, average daily sales data of the preset object, number of days for preparation of the preset object, a display-on-shelf quantity of the preset object, and stocking inventory data of the preset object.

In some embodiments of the disclosure, the apparatus further includes: a third obtaining module, configured to obtain sales data of the preset object in a historical time period from the warehousing data table; and a fourth determining module, configured to determine the average daily sales data of the preset object according to the sales data of the preset object in the historical time period.

In some embodiments of the disclosure, the first determining module includes: a sales data determining module, configured to determine sales data of the preset object in a first time period according to the arrival time length for the replenishment of the preset object, the replenishment cycle of the preset object, and the average daily sales data of the preset object, where the first time period is a sum of the arrival time length for the replenishment of the preset object and the replenishment cycle of the preset object; a safety inventory data determining module, configured to determine the safety inventory data of the preset object according to the sales data of the preset object in the first time period, the arrival time length for the replenishment of the preset object, the average daily sales data of the preset object, the display-on-shelf quantity of the preset object, and the stocking inventory data of the preset object, where the safety inventory data of the preset object is a maximum safety inventory data of the preset object.

In some embodiments of the disclosure, the second determining module is configured to determine the target inventory data of the preset object according to the average daily sales data of the preset object, the arrival time length for the replenishment of the preset object, the replenishment cycle of the preset object, and the number of days for preparation of the preset object.

In some embodiments of the disclosure, the apparatus further includes: an adjusting module, configured to obtain an adjusted replenishment quantity of the preset object by adjusting the replenishment quantity of the preset object according to a minimum order quantity of the preset object; and the sending module is configured to send the adjusted replenishment quantity of the preset object to the warehouse management system.

In some embodiments of the disclosure, the apparatus further includes: a fifth determining module, configured to determine, according to store information corresponding to the preset object, whether the store information is in a preset list; and a stopping module, configured to stop, when the store information is in the preset list, sending the replenishment quantity of the preset object to the warehouse management system.

According to a third aspect of the embodiments of this disclosure, there is provided an electronic device including: one or more processors; and a storage device, configured to store one or more programs that, when executed by the one or more processors, cause the one or more processors to implement the method for processing warehousing data according to the first aspect of the embodiments as described above.

According to a fourth aspect of the embodiments of this disclosure, there is provided a computer-readable medium storing a computer program thereon, where the program is used for, when executed by a processor, implementing the method for processing warehousing data according to the first aspect of the embodiments as described above.

It is to be understood that both the foregoing general description and the following detailed description are exemplary and explanatory only and are not restrictive of this disclosure.

BRIEF DESCRIPTION OF THE DRAWINGS

The accompanying drawings, which are incorporated in and constitute a part of this specification, illustrate embodiments consistent with this disclosure and together with the description serve to explain the principles of this disclosure. The drawings in the following description are only some embodiments of this disclosure, and for those of ordinary skill in the art, other drawings can also be obtained from these drawings without creative effort. In the attached drawings.

DETAILED DESCRIPTION

Figure 1:
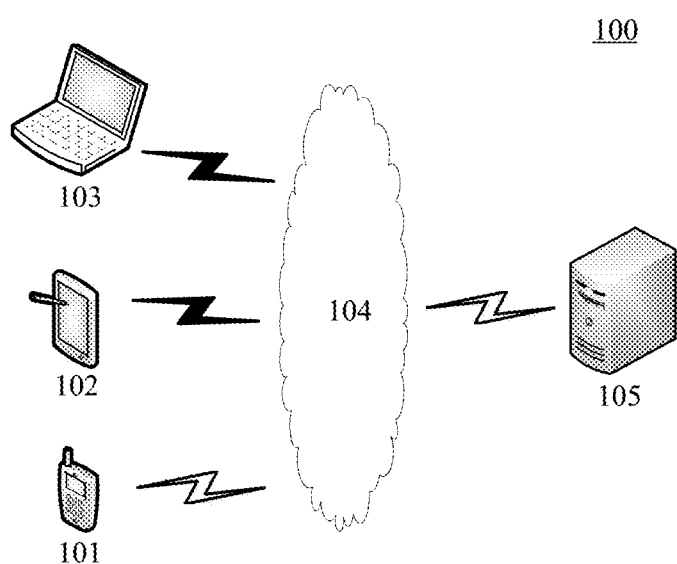
FIG. 1 shows a schematic diagram of an exemplary system architecture in which the method for processing warehousing data or the apparatus for processing warehousing data according to some embodiments of this disclosure can be applied.

Exemplary embodiments will now be described more fully with reference to the accompanying drawings. Exemplary embodiments, however, can be embodied in various forms and should not be construed as limited to the examples set forth herein. Rather, these embodiments are provided so that this disclosure will be thorough and complete, and will fully convey the concept of exemplary embodiments to those skilled in the art.

Furthermore, the described features, structures, or characteristics may be combined in any suitable manner in one or more embodiments. In the following description, numerous specific details are provided in order to give a thorough understanding of embodiments of this disclosure. However, those skilled in the art will appreciate that the technical solutions of this disclosure may be practiced without one or more of the specific details, or other methods, components, devices, steps, and the like may be employed. In other instances, well-known methods, devices, implementations, or operations have not been shown or described in detail to avoid obscuring aspects of this disclosure.

The block diagrams shown in the drawings are merely functional entities and do not necessarily correspond to physically separate entities. In other words, these functional entities may be implemented in software, or in one or more hardware modules or integrated circuits, or in different networks and/or processor devices and/or microcontroller devices.

The flowcharts shown in the drawings are only exemplary illustrations and do not necessarily include all contents and operations/steps, nor do they have to be performed in the order as described. For example, some operations/steps can be decomposed, and some operations/steps can be combined or partially combined, so the actual execution order may be changed according to the actual situation.

FIG. 1 shows a schematic diagram of an exemplary system architecture in which the method for processing warehousing data or the apparatus for processing warehousing data according to some embodiments of this disclosure can be applied.

As shown in FIG. 1, the system architecture 100 may include one or more of terminal devices 101, 102, and 103, a network 104 and a server 105. The network 104 is configured to provide the medium of communication links between the terminal devices 101, 102, 103 and the server 105. The network 104 may include various connection types, such as wired, wireless communication links, fiber optic cables, and the like.

It should be understood that the numbers of terminal devices, networks and servers in FIG. 1 are merely illustrative. There can be any number of terminal devices, networks and servers according to implementation needs. For example, the server 105 may be a server cluster composed of multiple servers, or the like.

The user can use the terminal devices 101, 102, 103 to interact with the server 105 through the network 104 to receive or send messages and the like. The terminal devices 101, 102, 103 may be various electronic devices with display screens, including but not limited to smart phones, tablet computers, portable computers, desktop computers, and the like.

The server 105 may be a server that provides various services. For example, the server 105 may obtain the attribute data of the preset object from the warehousing data table of the terminal device 103 (it may also be the terminal device 101 or 102), determine the safety inventory data of the preset object according to the attribute data of the preset object, then determine the target inventory data of the preset object according to the attribute data of the preset object, and obtain the current inventory data of the preset object. When the current inventory data of the preset object is less than or equal to the safety inventory data of the preset object, the server 105 may determine, according to the target inventory data of the preset object and the current inventory data of the preset object, the replenishment quantity of the preset object, and send the replenishment quantity of the preset object to the warehouse management system, so that the warehouse management system can replenish the preset object according to the replenishment quantity of the preset object. In this way, the replenishment timeliness of the warehouse management system can be improved to a certain extent, and the accuracy to for determining replenishment timing and replenishment quantity can be improved.

In some embodiments, the method for processing warehousing data according to some embodiments of this disclosure is typically executed by the server 105, and accordingly, the apparatus for processing warehousing data is typically provided in the server 105. In some other embodiments, some terminals having functions similar to the server may be configured to perform the method. Therefore, the method for processing warehousing data according to some embodiments of this disclosure is not limited to be executed on the server side.

Figure 2:
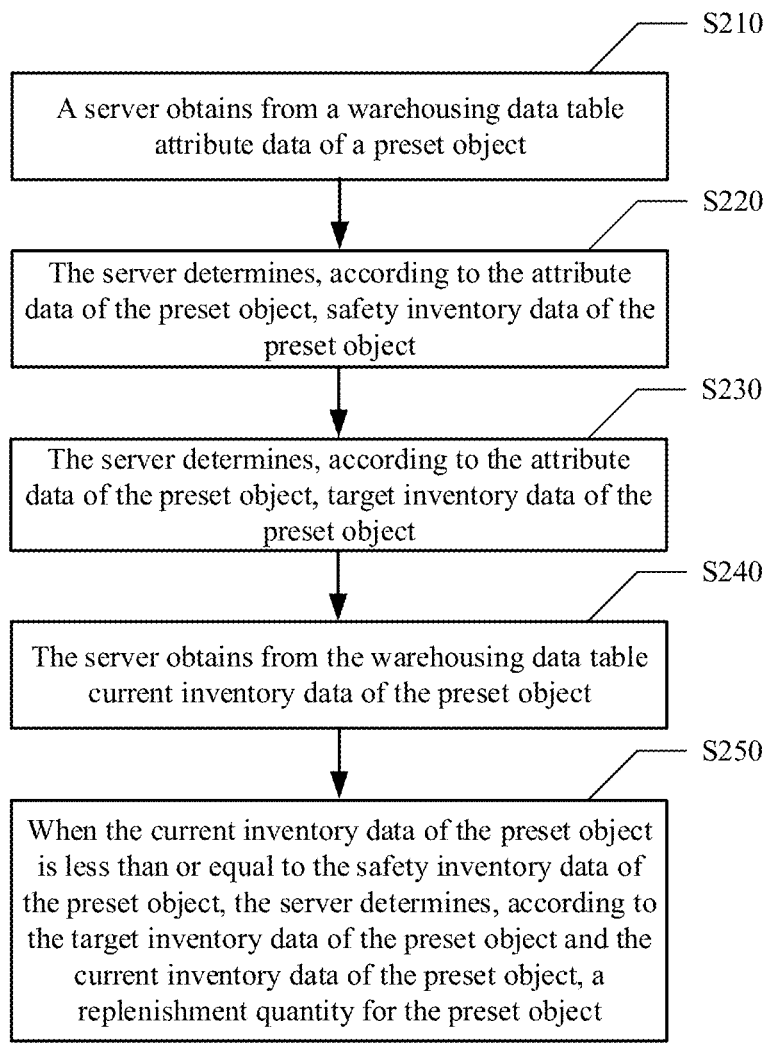
FIG. 2 schematically shows a flowchart of the method for processing warehousing data according to some embodiments of this disclosure.

FIG. 2 schematically shows a flowchart of the method for processing warehousing data according to some embodiments of this disclosure.

As shown in FIG. 2, the method for processing warehousing data may include steps S210 to S260.

In step S210, the server obtains the attribute data of the preset object from the warehousing data table.

In step S220, the server determines the safety inventory data of the preset object according to the attribute data of the preset object.

In step S230, the server determines the target inventory data of the preset object according to the attribute data of the preset object.

In step S240, the server obtains the current inventory data of the preset object from the warehousing data table.

In step S250, when the current inventory data of the preset object is less than or equal to the safety inventory data of the preset object, the server determines, according to the target inventory data of the preset object and the current inventory data of the preset object, the replenishment quantity of the preset object.

In step S260, the server sends the replenishment quantity of the preset object to the warehouse management system, causing the warehouse management system to perform replenishment according to the replenishment quantity of the preset object.

In the method, the safety inventory data of the preset object is determined according to the attribute data of the preset object, then the target inventory data of the preset object is determined according to the attribute data of the preset object, and the current inventory data of the preset object is obtained. When the current inventory data of the preset object is less than or equal to the safety inventory data of the preset object, the replenishment quantity of the preset object is determined according to the target inventory data of the preset object and the current inventory data of the preset object, and sent to the warehouse management system, so that the warehouse management system can perform the replenishment according to the replenishment quantity of the preset object, thereby improving the replenishment timeliness of the warehouse management system, and improving the accuracy for determining replenishment timing and replenishment quantity.

In some embodiments of this disclosure, the above-mentioned preset object may be a commodity in an offline store. For example, the preset object may be a fresh commodity (e.g., live fish, live shrimp, vegetables, fruit, bread).

In some embodiments of this disclosure, the above-mentioned warehousing data table may be a data table stored in the terminal, or may be a data table stored in the above-mentioned server. The attribute data of the preset object includes any one or more of the following items: an arrival time length for the replenishment of the preset object, a replenishment cycle of the preset object, average daily sales data of the preset object, number of days for preparation of the preset object, a display-on-shelf quantity of the preset object, and stocking inventory data of the preset object. For example, the arrival time length for the replenishment of the preset object may refer to a time length from when an orderer places the order to when the orderer receives the object. The replenishment cycle of the preset object may refer to how often the preset object is replenished. The average daily sales data of the preset object may refer to the average daily sales of the preset object in a past period of time. The number of days for preparation of the preset object may refer to a time length for the supplier to prepare the object. The display-on-shelf quantity of the preset object on the shelf may refer to the quantity of the preset object displayed on the store shelf. The stocking inventory data of the preset object may refer to the quantity of the preset object that the user puts into the baskets when purchasing the preset object but does not check out the preset object at the end.

In some embodiments of this disclosure, the safety inventory data of the preset object is determined according to the attribute data of the preset object. For example, the sales data of the preset object in a first time period is determined according to the arrival time length for the replenishment of the preset object, the replenishment cycle of the preset object, and the average daily sales data of the preset object, wherein the first time period is a sum of the arrival time length for the replenishment of the preset object and the replenishment cycle of the preset object. Then the safety inventory data of the preset object is determined according to the sales data of the preset object in the first time period, the arrival time length for the replenishment of the preset object, the average daily sales data of the preset object, the display-on-shelf quantity of the preset object, and the stocking inventory data of the preset object, where the safety inventory data of the preset object is the maximum safety inventory data of the preset object. Specifically, the maximum safety inventory data of the preset object may be calculated by the following formula:

$$\text{Safety Inventory} = \max(\text{Sum FCST}(1), \ldots, FCS(VLT+NRT)) + k \times \sqrt{\mu_L \sigma_D^2 + \mu_D \sigma_L^2}, \min(\text{display-on-shelf quantity, minimum display-on-shelf quantity (non-zero)}), \text{stocking inventory}+1)$$

Herein, Sum(FCST(1), ..., FCST(VLT+NRT)) is the sales data of the preset object in the first time period, k is the service level coefficient, $\mu_L$ is the arrival time length for the replenishment of the preset object, $\sigma_D$ is the standard deviation of the average daily sales data of the preset object, $\mu_D$ is the average daily sales data of the preset object, $\sigma_L$ is the standard deviation of the sales data of the preset object within the arrival time length for the replenishment of the preset object, the display-on-shelf quantity is the display-on-shelf quantity of the preset object on the shelf, and the stocking inventory is the stocking inventory data of the preset object.

Based on the above formula, the safety inventory data of the preset object can be quickly and accurately calculated, and the replenishment timing of the preset object can be accurately determined according to the safety inventory data of the preset object. For example, the replenishment timing of the preset object can be determined as when the current inventory data of the preset object is less than or equal to the safety inventory data of the preset object.

In some embodiments of this disclosure, determining the target inventory data of the preset object by the server according to the attribute data of the preset object includes: determining, by the server, the target inventory data of the preset object according to the average daily sales data of the preset object, the arrival time length for the replenishment of the preset object, the replenishment cycle of the preset object, and the number of days for preparation of the preset object. For example, the average daily sales data of the preset object is 10 pieces, the arrival time length for the replenishment of the preset object is 7 days, the replenishment cycle of the preset object is 5 days, and the number of days for preparation of the preset object is 20 days, then the target inventory data of the preset object=10*(7+5+20)=320 pieces. In some embodiments, when the replenishment timing is reached, that is, when the current inventory data of the preset object is less than or equal to the safety inventory data of the preset object, the replenishment quantity of the preset object can be determined according to the target inventory data of the preset object and the current inventory data of the preset object, and the replenishment quantity calculated in this way is more accurate.

Figure 3:
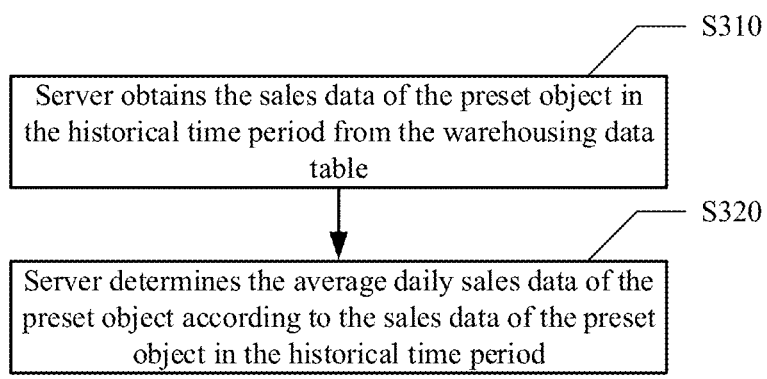
FIG. 3 schematically shows a flowchart of the method for processing warehousing data according to some other embodiments of this disclosure.

FIG. 3 schematically shows a flowchart of the method for processing warehousing data according to some other embodiments of this disclosure.

As shown in FIG. 3, the above method may further include steps S207 and S208.

In step S207, the server obtains the sales data of the preset object in the historical time period from the above-mentioned warehousing data table.

In step S208, the server determines the average daily sales data of the preset object according to the sales data of the preset object in the historical time period.

In this method, the average daily sales data of the preset object can be determined according to the sales data of the preset object in the historical time period, so as to calculate the sales data of the preset object in the future time period according to the average daily sales data.

In some embodiments of this disclosure, the sales data of the preset object in the historical time period may refer to the sales volume of the preset object in the past 7 days, one month, three months or other time periods.

In some embodiments, the average daily sales data of the preset object may be calculated according to the sales data of the preset object in the historical time period. For example, the historical time period is 7 days, and the sales data for past 7 days are 100, 90, 110, 80, 120, 95, and 85

(pieces), respectively. The average daily sales data of the preset object can be calculated according to the sales data of the 7 days, for example, the average daily sales data of the preset object=(100+90+110+80+120+95+85)/7=97.

Figure 4:
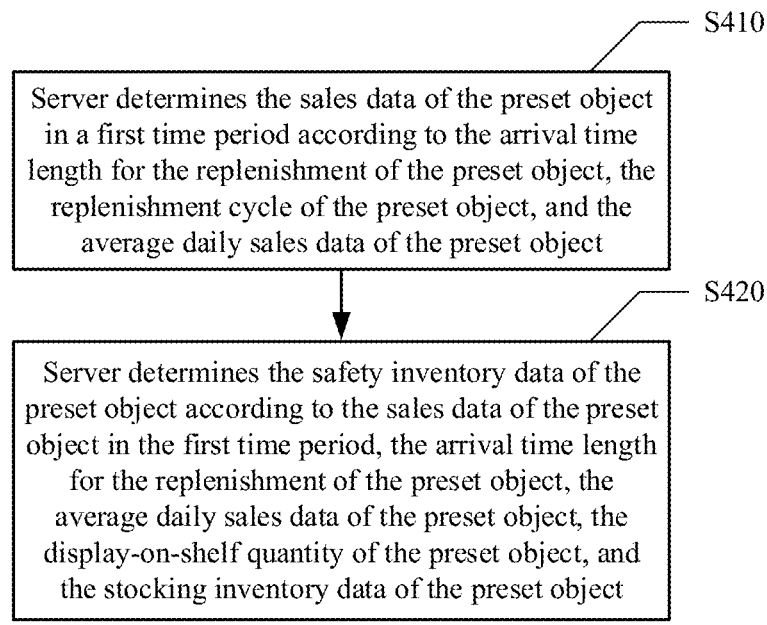
FIG. 4 schematically shows a flowchart of the method for processing warehousing data according to some other embodiments of this disclosure.

FIG. 4 schematically shows a flowchart of the method for processing warehousing data according to some other embodiments of this disclosure.

As shown in FIG. 4, the foregoing step S220 may specifically include steps S410 to S420, as shown in FIG. 4.

In step S410, the server determines the sales data of the preset object in a first time period according to the arrival time length for the replenishment of the preset object, the replenishment cycle of the preset object, and the average daily sales data of the preset object, where the first time period is a sum of the arrival time length for the replenishment of the preset object and the replenishment cycle of the preset object.

In step S420, the server determines the safety inventory data of the preset object according to the sales data of the preset object in the first time period, the arrival time length for the replenishment of the preset object, the average daily sales data of the preset object, the display-on-shelf quantity of the preset object, and the stocking inventory data of the preset object, where the safety inventory data of the preset object is a maximum safety inventory data of the preset object.

In this method, the safety inventory data of the preset object can be calculated through a multi-dimension way, which is more comprehensive, so that the safety inventory data obtained by the calculation in this method is more accurate. For example, the multi-dimension may include the sales data of the preset object in the first time period, the arrival time length for the replenishment of the preset object, the average daily sales data of the preset object, the display-on-shelf quantity of the preset object, and the stocking inventory data of the preset object.

In some embodiments of this disclosure, the sales data of the preset object in the first time period is determined according to the arrival time length for the replenishment of the preset object, the replenishment cycle of the preset object, and the average daily sales data of the preset object, where the first time period is the sum of the arrival time length for the replenishment of the preset object and the replenishment cycle of the preset object. Then, the safety inventory data of the preset object is determined according to the sales data of the preset object in the first time period, the arrival time length for the replenishment of the preset object, the average daily sales data of the preset object, the display-on-shelf quantity of the preset object, and the stocking inventory data of the preset object, where the safety inventory data of the preset object is the maximum safety inventory data of the preset object. Specifically, the maximum safety inventory data of the preset object may be calculated by the following formula:

$$\text{Safety Inventory} = \max(\text{Sum FCST}(1), \ldots, \text{FCS}(VLT+NRT)) + k \times \sqrt{\mu_L \sigma_D^2 + \mu_D \sigma_L^2}, \min(\text{display-on-shelf quantity}, \text{minimum display-on-shelf quantity (non-zero)}), \text{stocking inventory} + 1)$$

Herein, Sum(FCST(1), ..., FCST(VLT+NRT)) is the sales data of the preset object in the first time period, k is the service level coefficient, $\mu_L$ is the arrival time length for the replenishment of the preset object, $\sigma_D$ is the standard deviation of the average daily sales data of the preset object, $\mu_D$ is the average daily sales data of the preset object, $\sigma_L$ is the standard deviation of the sales data of the preset object within the arrival time length for the replenishment of the preset object, the display-on-shelf quantity is the display-on-shelf quantity of the preset object on the shelf, and the stocking inventory is the stocking inventory data of the preset object.

Based on the above formula, the safety inventory data of the preset object can be quickly and accurately calculated, and the replenishment timing of the preset object can be accurately determined according to the safety inventory data of the preset object.

In some embodiments of this disclosure, the above method further includes: obtaining, by the server, an adjusted replenishment quantity of the preset object by adjusting the replenishment quantity of the preset object according to a minimum order quantity of the preset object, so that the replenishment quantity of the preset object can be optimized in time to avoid the order being delayed.

In some embodiments of this disclosure, sending, by the server, the replenishment quantity of the preset object to the warehouse management system includes: sending, by the server, the adjusted replenishment quantity of the preset object to the warehouse management system, so that the warehouse management system can perform the replenishment according to the adjusted replenishment quantity, thereby further improving the accuracy of replenishment.

Figure 5:
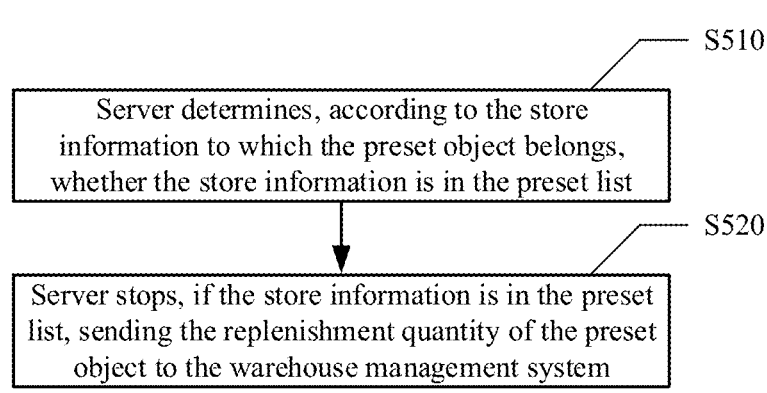
FIG. 5 schematically shows a flowchart of the method for processing warehousing data according to some other embodiments of this disclosure.

FIG. 5 schematically shows a flowchart of the method for processing warehousing data according to some other embodiments of this disclosure.

As shown in FIG. 5, the above method may further include steps S510 and S520.

In step S510, the server determines, according to the store information to which the preset object belongs, whether the store information is in the preset list.

In step S520, if the store information is in the preset list, the server stops sending the replenishment quantity of the preset object to the warehouse management system.

In this method, whether the store information is in the preset list can be determined according to the store information corresponding to the preset object, and if the store information is in the preset list, sending the replenishment quantity of the preset object to the warehouse management system is terminated, which can effectively avoid sending the replenishment quantity of the preset object to the warehouse management system by mistake, thereby further improving the replenishment efficiency.

In some embodiments of this disclosure, the above store information may include, but is not limited to, store name, store address, store code, store owner's name, store owner's ID number, and the like.

In some embodiments of this disclosure, the above-mentioned preset list may be a black list, which is used to store the information of stores that do not meet the replenishment conditions. For example, a store has been blacklisted due to reputation issues.

In some embodiments of this disclosure, whether the store information is in the preset list is determined according to the store information to which the preset object belongs. For example, based on the store information to which the preset object belongs, it is queried from the preset list whether there is the same information as the preset object. If there is, it indicates that the store information to which the preset object belongs is in the preset list.

In some embodiments of this disclosure, if the store information to which the preset object belongs is queried from the preset list, the sending of the replenishment quantity of the preset object to the warehouse management system is terminated, which can effectively avoid sending the warehouse management system to the warehouse management system by mistake, thereby further improving the replenishment efficiency.

Figures 6, 7:
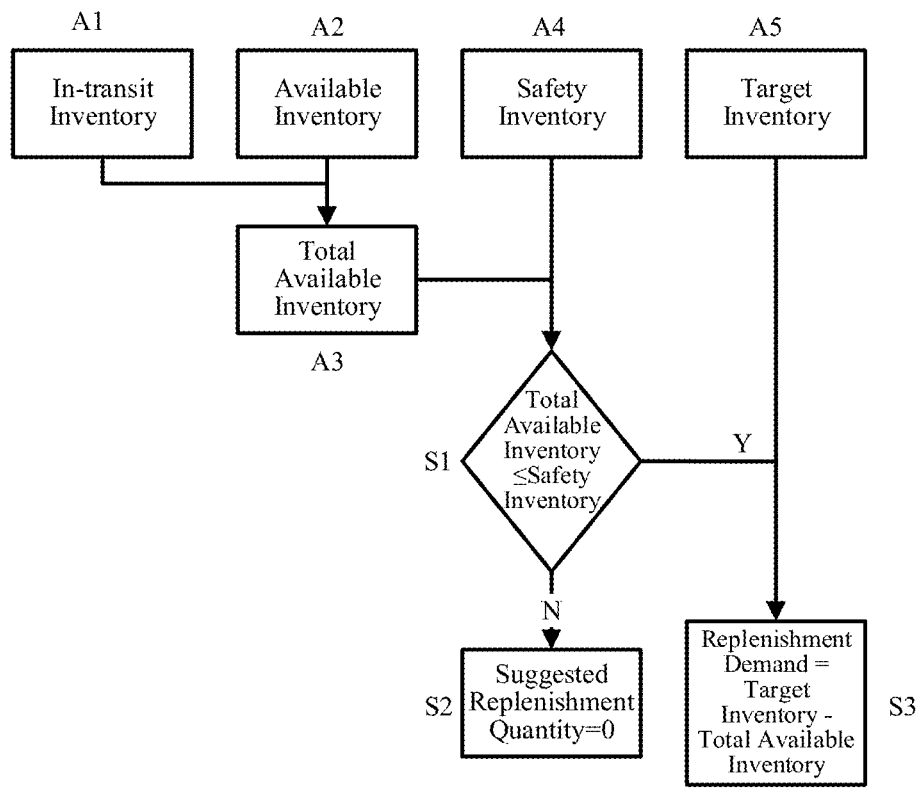
FIG. 6 schematically shows a schematic diagram of calculating target inventory and replenishment points according to this disclosure.
FIG. 7 schematically shows a schematic diagram of the method for processing warehousing data according to this disclosure.

FIG. 6 schematically shows a schematic diagram of calculating target inventory and replenishment points according to this disclosure.

As shown in FIG. 6, BP represents the sum of the arrival time length for the replenishment of the preset object, the replenishment cycle of the preset object, and the number of days for preparation of the preset object; the average sales represent the average daily sales data of the preset object; and the target inventory represents the target inventory data of the preset object. For example, the average daily sales data of the preset object is 10 pieces, the arrival time length for replenishment of the preset object is 7 days, the replenishment cycle of the preset object is 5 days, and number of days for preparation of the preset object is 20 days, then the target inventory data of the object=10*(7+5+20)=320 pieces.

Here, VLT represents the arrival time length for replenishment of the preset object, NRT represents the replenishment cycle of the preset object, and ss represents the calculation based on the formula $k \times \sqrt{\mu_L \sigma_D^2 + \mu_D \sigma_L^2}$, min (display-on-shelf quantity, minimum display-on-shelf quantity (non-zero)), stocking inventory+1). The replenishment point may be the maximum safety inventory data as described above.

The suggested replenishment quantity may be the replenishment quantity of the preset object, available inventory+in-transit inventory=the above-mentioned current inventory data, where the available inventory may refer to the quantity of the preset object in the store, and the in-transit inventory may refer to the preset object quantity in transit.

Based on the target inventory data of the above preset object=10*(7+5+20)=320 pieces, the replenishment quantity of the preset object=320−(available inventory+in-transit inventory).

FIG. 7 schematically shows a schematic diagram of the method for processing warehousing data according to this disclosure.

As shown in FIG. 7, A1 is the in-transit inventory, that is, the above-mentioned quantity of the preset object in transit; A2 is the available inventory, that is, the above-mentioned quantity of the preset object in the store; A3 is the total available inventory, that is, the above-mentioned current inventory data; A4 is the safety inventory, that is, the above-mentioned maximum safety inventory data; and A5 is the target inventory, that is, the above-mentioned target inventory data.

In S1, it is determined whether the total available inventory is less than or equal to the safety inventory.

In S2, if not, the suggested replenishment quantity is zero, that is, the above-mentioned replenishment quantity of the preset object is zero.

In S3, if yes, the replenishment demand, that is, the replenishment quantity of the preset object, is calculated based on the target inventory and the total available inventory. For example, Replenishment Demand=Target Inventory−Total Available Inventory.

In the above manner, the replenishment demand is sent to the warehouse management system, thereby improving the replenishment accuracy of preset object, increasing the optimal replenishment quantity, reducing the inventory loss, reducing operational workload, and improving the replenishment efficiency of preset object. In addition, the recommended order quantity is derived by using predicted future sales data and existing inventory information in combination with the replenishment configuration, and orders can be automatically placed through the automatic replenishment configuration, assuming that the future sales trend is consistent with the predicted sales data, and the reasonable recommended order quantity is calculated based on the formula, which is suitable for most scenarios of replenishment-related business, so as to improve the replenishment timeliness, and solves the core problems of the supply chain.

Figure 8:
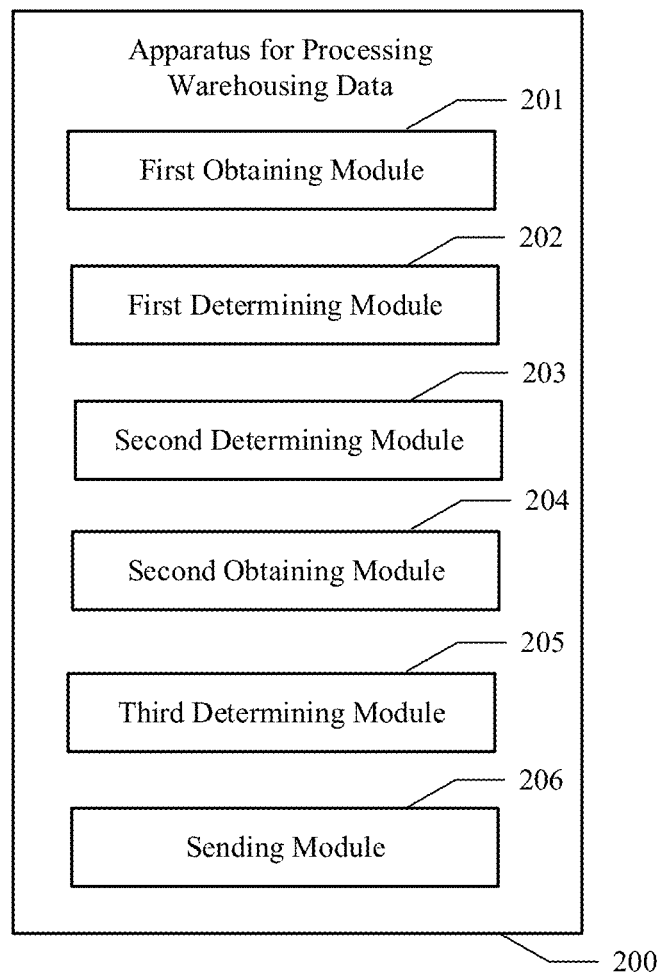
FIG. 8 schematically shows a block diagram of the apparatus for processing warehousing data according to some embodiments of this disclosure.

FIG. 8 schematically shows a block diagram of the apparatus for processing warehousing data according to some embodiments of this disclosure.

As shown in FIG. 8, the apparatus 200 for processing warehousing data includes a first obtaining module 201, a first determining module 202, a second determining module 203, a second obtaining module 204, a third determining module 205 and a sending module 206.

Specifically, the first obtaining module 201 is configured to obtain attribute data of the preset object.

The first determining module 202 is configured to determine the safety inventory data of the preset object according to the attribute data of the preset object.

The second determining module 203 is configured to determine the target inventory data of the preset object according to the attribute data of the preset object.

The second obtaining module 204 is configured to obtain the current inventory data of the preset object.

The third determining module 205 is configured to determine, when the current inventory data of the preset object is less than or equal to the safety inventory data of the preset object, a replenishment quantity of the preset object according to the target inventory data of the preset object and the current inventory data of the preset object.

The sending module 206 is configured to send the replenishment quantity of the preset object to the warehouse management system, causing the warehouse management system to perform replenishment according to the replenishment quantity of the preset object.

The apparatus 200 for processing warehousing data can obtain the attribute data of the preset object, determine the safety inventory data of the preset object according to the attribute data of the preset object, determine the target inventory data of the preset object according to the attribute data of the preset object, then obtain the current inventory data of the preset object, when the current inventory data of the preset object is less than or equal to the safety inventory data of the preset object, determine the replenishment quantity of the preset object according to the target inventory data of the preset object and the current inventory data of the preset object, and send the replenishment quantity of the preset object to the warehouse management system, so that the warehouse management system can perform the replenishment according to the replenishment quantity of the preset object. In this way, the replenishment timeliness of the warehouse management system can be improved to a certain extent, and the accuracy for determining replenishment timing and replenishment quantity can be improved.

According to some embodiments of this disclosure, the apparatus 200 for processing warehousing data may be configured to implement the method for processing warehousing data described in the embodiments of FIG. 2.

Figure 9:
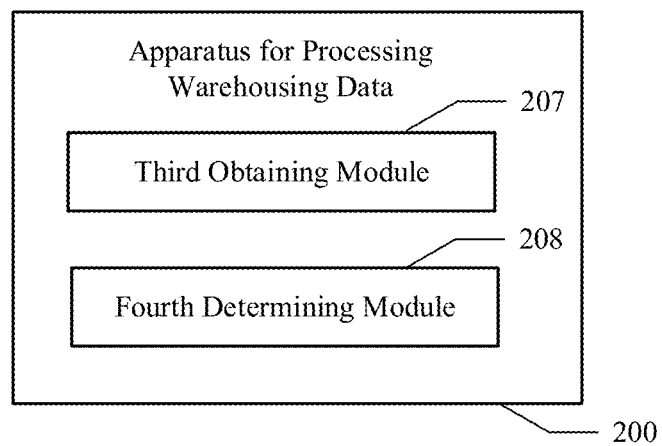
FIG. 9 schematically shows a block diagram of the apparatus for processing warehousing data according to some other embodiments of this disclosure.

FIG. 9 schematically shows a block diagram of the apparatus for processing warehousing data according to some other embodiments of this disclosure.

As shown in FIG. 9, the above-mentioned apparatus 200 for processing warehousing data may further include a third obtaining module 207 and a fourth determining module 208.

Specifically, the third obtaining module 207 is configured to obtain sales data of the preset object within a historical time period.

The fourth determining module 208 is configured to determine the average daily sales data of the preset object according to the sales data of the preset object within the historical time period.

The apparatus 200 for processing warehousing data can determine the average daily sales data of the preset object according to the sales data of the preset object within the historical time period, so as to calculate the sales volume of the preset object in a future time period according to the average daily sales data.

According to some embodiments of this disclosure, the apparatus 200 for processing warehousing data may be configured to implement the method for processing warehousing data described in the embodiments of FIG. 3.

Figure 10:
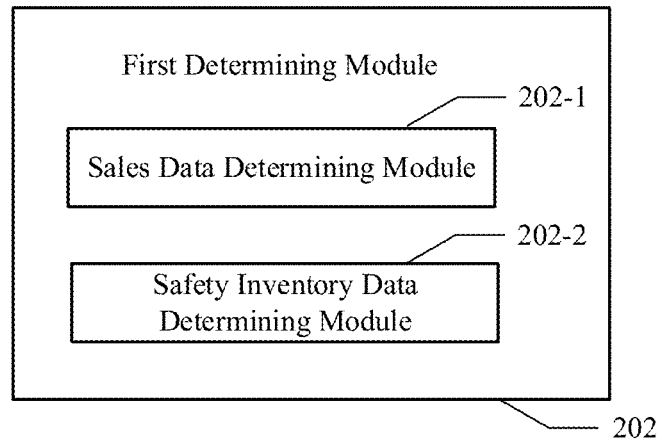
FIG. 10 schematically shows a block diagram of the apparatus for processing warehousing data according to some other embodiments of this disclosure.

FIG. 10 schematically shows a block diagram of the apparatus for processing warehousing data according to some other embodiments of this disclosure.

As shown in FIG. 10, the above-mentioned first determining module 202 may specifically include a sales data determining module 202-1 and a safety inventory data determining module 202-2.

Specifically, the sales data determining module 202-1 is configured to determine sales data of the preset object in a first time period according to the arrival time length for the replenishment of the preset object, the replenishment cycle of the preset object, and the average daily sales data of the preset object, where the first time period is a sum of the arrival time length for the replenishment of the preset object and the replenishment cycle of the preset object.

The safety inventory data determining module 202-2 is configured to determine the safety inventory data of the preset object according to the sales data of the preset object in the first time period, the arrival time length for the replenishment of the preset object, the average daily sales data of the preset object, the display-on-shelf quantity of the preset object, and the stocking inventory data of the preset object, where the safety inventory data of the preset object is a maximum safety inventory data of the preset object.

The first determining module 202 can calculate the safety inventory data of the preset object through a multi-dimension way, which is more comprehensive, so that the safety inventory data obtained by the calculation in this manner is more accurate. For example, the multi-dimension may include the sales data of the preset object in the first time period, the arrival time length for the replenishment of the preset object, the average daily sales data of the preset object, the display-on-shelf quantity of the preset object, and the stocking inventory data of the preset object.

According to some embodiments of this disclosure, the first determining module 202 may be configured to implement the method for processing warehousing data described in the embodiments of FIG. 4.

In some embodiments of this disclosure, the above-mentioned second determining module 203 is configured to determine the target inventory data of the preset object according to the average daily sales data of the preset object, the arrival time length for the replenishment of the preset object, the replenishment cycle of the preset object, and the number of days for preparation of the preset object.

Figure 11:
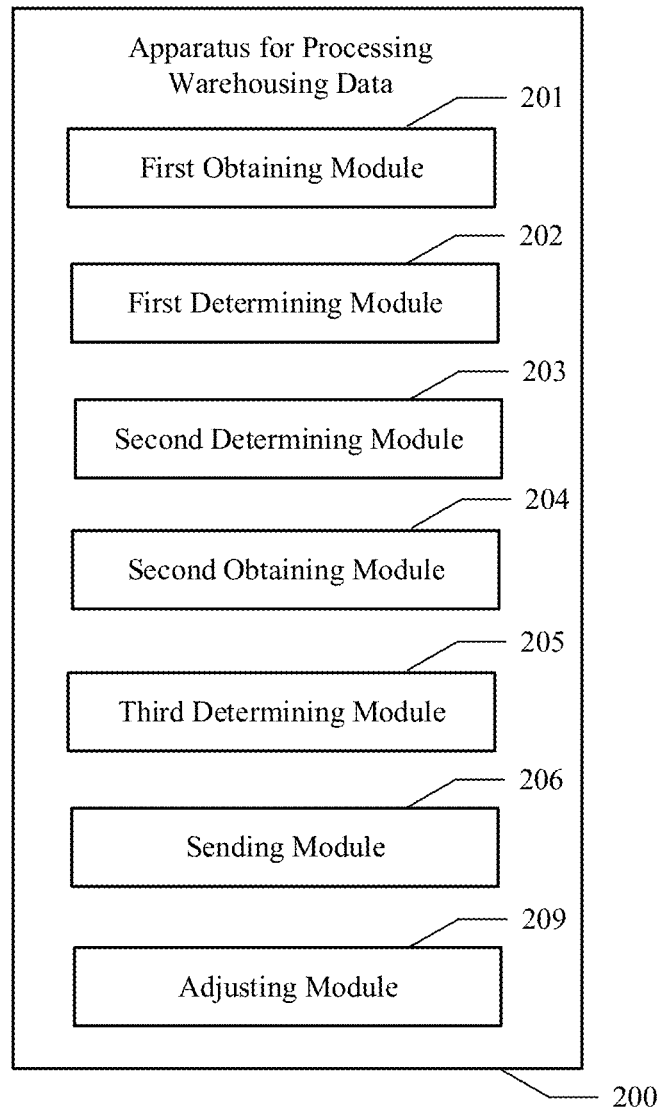
FIG. 11 schematically shows a block diagram of the apparatus for processing warehousing data according to some other embodiments of this disclosure.

FIG. 11 schematically shows a block diagram of the apparatus for processing warehousing data according to some other embodiments of this disclosure.

As shown in FIG. 11, the above-mentioned apparatus 200 for processing warehousing data may further include an adjusting module 209.

Specifically, the adjusting module 209 is configured to obtain an adjusted replenishment quantity of the preset object by adjusting the replenishment quantity of the preset object according to a minimum order quantity of the preset object.

The apparatus 200 for processing warehousing data can adjust the replenishment quantity of the preset object according to the minimum order quantity of the preset object, and obtain the adjusted replenishment quantity of the preset object, so that the replenishment quantity of the preset object can be optimized in time to prevent the order from being delayed.

In some embodiments of this disclosure, the above-mentioned sending module 206 is configured to send the adjusted replenishment quantity of the preset object to the warehouse management system.

Figure 12:
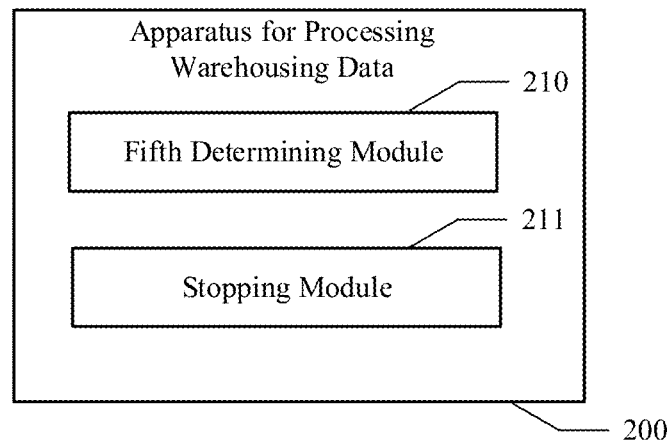
FIG. 12 schematically shows a block diagram of the apparatus for processing warehousing data according to some other embodiments of this disclosure.

FIG. 12 schematically shows a block diagram of the apparatus for processing warehousing data according to some other embodiments of this disclosure.

As shown in FIG. 12, the above-mentioned apparatus 200 for processing warehousing data may further include a fifth determining module 210 and a stopping module 211.

Specifically, the fifth determining module 210 is configured to determine whether the store information is in the preset list according to the store information to which the preset object belongs.

The stopping module 211 is configured to stop, when the store information is in the preset list, sending the replenishment quantity of the preset object to the warehouse management system.

The apparatus 200 for processing warehousing data can determine whether the store information is in the preset list according to the store information to which the preset object belongs, and if the store information is in the preset list, stop sending the replenishment quantity of the preset object to the warehouse management system, thereby effectively avoiding sending the replenishment quantity of the preset object to the warehouse management system by mistake, and further improving the replenishment efficiency.

According to some embodiments of this disclosure, the apparatus 200 for processing warehousing data may be configured to implement the method for processing warehousing data described in the embodiments of FIG. 5.

Since the modules of the apparatus 200 for processing warehousing data according to some exemplary embodiments of this disclosure can be configured to implement the steps of the method for processing warehousing data according to some exemplary embodiments described in the foregoing FIG. 2 to FIG. 5. Therefore, for those details omitted in the apparatus embodiments of the disclosure, the embodiments of the above-mentioned method for processing warehousing data of this disclosure can be referred to.

It can be understood that the first obtaining module 201, the first determining module 202, the sales data determining module 202-1, the safety inventory data determining module 202-2, the second determining module 203, the second obtaining module 204, the third determining module 205, the sending module 206, the third obtaining module 207, the fourth determining module 208, the adjusting module 209, the fifth determining module 210, and the stopping module 211 may be combined in one module for implementation, or any one of the modules may be split into multiple modules. Alternatively, at least part of the functionality of one or more of these modules may be combined with at least part of the functionality of other modules and implemented in one module. According to some embodiments of this disclosure, at least one of the first obtaining module 201, the first determining module 202, the sales data determining module 202-1, the safety inventory data determining module 202-2, the second determining module 203, the second obtaining module 204, the third determining module 205, the sending module 206, the third obtaining module 207, the fourth determining module 208, the adjusting module 209, the fifth determining module 210, and the stopping module 211 may be implemented at least partially as a hardware circuit, such as a field programmable gate array (FPGA), a programmable logic array (PLA), a system on chip, a system on substrate, a system on package, an application specific integrated circuit (ASIC), or may be implemented in hardware or firmware through integration, package or any other reasonable manner of circuits, or implemented in an appropriate combination of those three implementation modes of software, hardware and firmware. Alternatively, at least one of the first obtaining module 201, the first determining module 202, the sales data determining module 202-1, the safety inventory data determining module 202-2, the second determining module 203, the second obtaining module 204, the third determining module 205, the sending module 206, the third obtaining module 207, the fourth determining module 208, the adjusting module 209, the fifth determining module 210, and the stopping module 211 may be implemented at least in part as a computer program module, when the program is executed by a computer, the function of the corresponding module can be executed.

Figure 13:
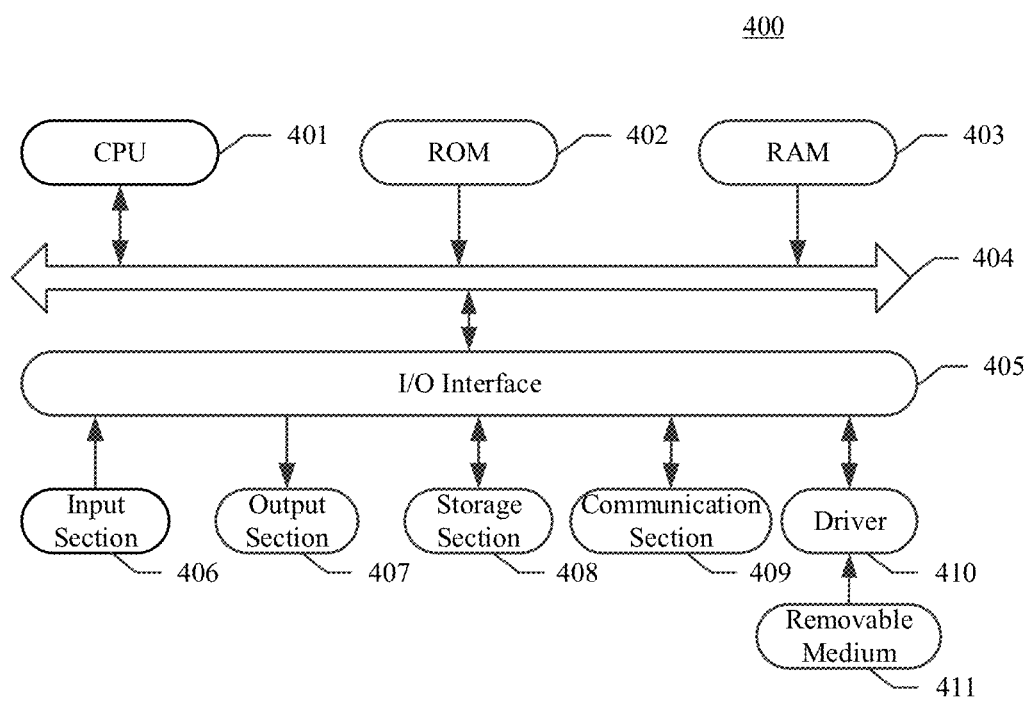
FIG. 13 shows a schematic structural diagram of a computer system suitable for implementing the electronic device according to some embodiments of this disclosure.

Referring next to FIG. 13, it shows a schematic structural diagram of a computer system 400 suitable for implementing the electronic device according to some embodiments of this disclosure (for example, the electronic device may be the above-mentioned server). The computer system 400 of the electronic device shown in FIG. 13 is only an example, and should not impose any limitation on the function and scope of use of the embodiments of this disclosure.

As shown in FIG. 13, a computer system 400 includes a central processing unit (CPU) 401, which may be configured to perform various appropriate actions and processes based on a program stored in a read only memory (ROM) 402 or a program loaded from a storage section 408 into a random access memory (RAM) 403. In the RAM 403, various programs and data required for system operation may also be stored. The CPU 401, the ROM 402, and the RAM 403 are connected to each other through a bus 404. An input/output (I/O) interface 405 is also connected to bus 404.

The following components are connected to the I/O interface 405: an input section 406 including a keyboard, a mouse, and the like; an output section 407 including a cathode ray tube (CRT), a liquid crystal display (LCD), a speaker, and the like; a storage section 408 including a hard disk and the like; and a communication section 409 including a network interface card such as a LAN card, a modem, and the like. The communication section 409 performs communication processing via a network such as the Internet. A drive 410 is also connected to the I/O interface 405 as needed. A removable medium 411, such as a magnetic disk, an optical disk, a magneto-optical disk, a semiconductor memory, and the like, is mounted on the drive 410 as needed so that a computer program read therefrom is installed into the storage section 408 as needed.

In particular, the processes described above with reference to the flowcharts may be implemented as computer software programs according to some embodiments of this disclosure. For example, some embodiments of this disclosure include a computer program product, which includes a computer program carried on a computer-readable medium and including program codes used for performing the method illustrated in the flowcharts. In some embodiments, the computer program may be downloaded and installed from the network via the communication section 409 and/or installed from the removable medium 411. When the computer program is executed by the central processing unit (CPU) 401, the above-described functions defined in the system of the present application are executed.

It should be noted that the computer-readable medium shown in this disclosure may be a computer-readable signal medium or a computer-readable storage medium, or any combination of the above two. The computer readable storage medium may be, for example, but not limited to, an electrical, magnetic, optical, electromagnetic, infrared, or semiconductor system, apparatus or device, or a combination of any of the above. More specific examples of computer readable storage medium may include, but are not limited to, electrical connections having one or more wires, portable computer disks, hard disks, random access memory (RAM), read only memory (ROM), erasable programmable read only memory (EPROM), flash memory, optical fiber, portable compact disk read only memory (CD-ROM), optical storage devices, magnetic storage devices, or any suitable combination of the above. In this disclosure, a computer-readable storage medium may be any tangible medium that contains or stores a program used by or in conjunction with an instruction execution system, apparatus, or device. In this disclosure, however, a computer-readable signal medium may include a data signal propagated in baseband or as part of a carrier wave, carrying computer-readable program code therein. Such propagated data signals may take a variety of forms, including but not limited to electromagnetic signals, optical signals, or any suitable combination of the foregoing. A computer-readable signal medium may also be any computer-readable medium other than a computer-readable storage medium that can transmit, propagate, or transport the program for use by or in connection with the instruction execution system, apparatus, or device. Program code embodied on the computer readable medium may be transmitted using any suitable medium including, but not limited to, wireless, wireline, optical fiber cable, RF, or any suitable combination of the foregoing.

The flowchart and block diagrams in the drawings illustrate the architecture, functionality, and operation of possible implementations of systems, methods and computer program products according to various embodiments of this disclosure. In this regard, each block in the flowchart or block diagrams may represent a module, segment, or section of code that contains one or more executable instructions for implementing the specified functions. It should also be noted that, in some alternative implementations, the functions noted in the blocks may occur out of the order noted in the drawings. For example, two blocks shown in succession may, in fact, be executed substantially concurrently, or the blocks may sometimes be executed in the reverse order, depending upon the functionality involved. It is also noted that each block of the block diagrams or flowchart illustrations, and combinations of blocks in the block diagrams or flowchart illustrations, can be implemented in special purpose hardware-based systems that perform the specified functions or operations, or can be implemented using a combination of dedicated hardware and computer instructions.

The units involved in some embodiments of this disclosure may be implemented in a software manner, or may be implemented in a hardware manner, and the described units may also be provided in a processor. Herein, the names of these units do not constitute a limitation on the unit itself under certain circumstances.

As another aspect, the present application also provides a computer-readable medium. The computer-readable medium may be included in the electronic device described in the above embodiments; it may also exist alone without being provided in the electronic device. The above computer readable medium carries one or more programs, and when the one or more programs are executed by the electronic device, the electronic device implements the method for processing warehousing data described in the above embodiments.

For example, the electronic device can implement steps as shown in FIG. 2. In step S210, the server obtains the attribute data of the preset object from the warehousing data table. In step S220, the server determines the safety inventory data of the preset object according to the attribute data of the preset object. In step S230, the server determines the target inventory data of the preset object according to the attribute data of the preset object. In step S240, the server obtains the current inventory data of the preset object from the warehousing data table. In step S250, when the current inventory data of the preset object is less than or equal to the safety inventory data of the preset object, the server determines, according to the target inventory data of the preset object and the current inventory data of the preset object, the replenishment quantity of the preset object. In step S260, the server sends the replenishment quantity of the preset object to the warehouse management system, so that the warehouse management system performs replenishment according to the replenishment quantity of the preset object.

It should be noted that although several modules or units of the apparatus for action performance are mentioned in the above detailed description, this division is not mandatory. Indeed, according to some embodiments of this disclosure, the features and functions of two or more modules or units described above may be embodied in one module or unit. Conversely, the features and functions of one module or unit described above may be further divided into multiple modules or units to be embodied.

From the description of the above embodiments, those skilled in the art can easily understand that the exemplary embodiments described herein may be implemented by software, or may be implemented by software combined with necessary hardware. Therefore, the technical solutions according to some embodiments of this disclosure can be embodied in the form of a software product, and the software product can be stored in a non-volatile storage medium (e.g., CD-ROM, U disk, mobile hard disk, and the like) or on the network, which includes several instructions to cause a computing device (e.g., a personal computer, a server, a touch terminal, a network device, and the like) to execute the method according to some embodiments of this disclosure.

Other embodiments of this disclosure will readily occur to those skilled in the art upon consideration of the specification and practice of this disclosure disclosed herein. This application is intended to cover any variations, uses or adaptations of this disclosure which follow the general principles of this disclosure and which include common knowledge or conventional techniques in the art not disclosed herein. The specification and examples are to be regarded as exemplary only, with the true scope and spirit of this disclosure being indicated by the following claims.

It should be understood that this disclosure is not limited to the precise structures described above and illustrated in the accompanying drawings, and that various modifications and changes may be made without departing from its scope. The scope of this disclosure is limited only by the appended claims.

What is claimed is:

1. A method for processing warehousing data, comprising:
obtaining, by a server, attribute data of a preset object from a warehousing data table;
determining, by the server, safety inventory data of the preset object according to the attribute data of the preset object;
determining, by the server, target inventory data of the preset object according to the attribute data of the preset object;
obtaining, by the server, current inventory data of the preset object from the warehousing data table;
determining, by the server in response to that the current inventory data of the preset object is less than or equal to the safety inventory data of the preset object, a replenishment quantity of the preset object according to the target inventory data of the preset object and the current inventory data of the preset object; and
sending, by the server, the replenishment quantity of the preset object to a warehouse management system, causing the warehouse management system to perform replenishment according to the replenishment quantity of the preset object;
wherein the attribute data of the preset object comprises any one or more of following items: an arrival time length for the replenishment of the preset object, a replenishment cycle of the preset object, average daily sales data of the preset object, number of days for preparation of the preset object, a display-on-shelf quantity of the preset object, and stocking inventory data of the preset object;
the method further comprising:
obtaining, by the server, sales data of the preset object in a historical time period from the warehousing data table; and
determining, by the server, the average daily sales data of the preset object according to the sales data of the preset object in the historical time period;
determining, by the server according to store information corresponding to the preset object, whether the store information is in a preset list; and
stopping, by the server in response to that the store information is in the preset list, sending the replenishment quantity of the preset object to the warehouse management system;
wherein the determining, by the server, the safety inventory data of the preset object according to the attribute data of the preset object comprises:
determining, by the server, sales data of the preset object in a first time period according to the arrival time length for the replenishment of the preset object, the replenishment cycle of the preset object, and the average daily sales data of the preset object, wherein the first time period is a sum of the arrival time length for the replenishment of the preset object and the replenishment cycle of the preset object;
determining, by the server, the safety inventory data of the preset object according to the sales data of the preset object in the first time period, the arrival time length for the replenishment of the preset object, the average daily sales data of the preset object, the display-on-shelf quantity of the preset object, and the stocking inventory data of the preset object, wherein the safety inventory data of the preset object is a maximum safety inventory data of the preset object.

2. The method of claim 1, wherein the determining, by the server, the target inventory data of the preset object according to the attribute data of the preset object comprises:
determining, by the server, the target inventory data of the preset object according to the average daily sales data of the preset object, the arrival time length for the replenishment of the preset object, the replenishment cycle of the preset object, and the number of days for preparation of the preset object.

3. The method of claim 1, further comprising:
obtaining, by the server, an adjusted replenishment quantity of the preset object by adjusting the replenishment quantity of the preset object according to a minimum order quantity of the preset object;
wherein sending, by the server, the replenishment quantity of the preset object to the warehouse management system comprises:
sending, by the server, the adjusted replenishment quantity of the preset object to the warehouse management system.

4. An electronic device comprising:
one or more processors; and
a storage device, configured to store one or more programs that, when executed by the one or more processors, cause the one or more processors to implement actions comprising:
obtain attribute data of a preset object from a warehousing data table;
determine safety inventory data of the preset object according to the attribute data of the preset object;
determine target inventory data of the preset object according to the attribute data of the preset object;
obtain current inventory data of the preset object from the warehousing data table;
determine, in response to that the current inventory data of the preset object is less than or equal to the safety inventory data of the preset object, a replenishment quantity of the preset object according to the target inventory data of the preset object and the current inventory data of the preset object; and
send the replenishment quantity of the preset object to a warehouse management system, causing the warehouse management system to perform replenishment according to the replenishment quantity of the preset object;
wherein the attribute data of the preset object comprises any one or more of following items: an arrival time length for the replenishment of the preset object, a replenishment cycle of the preset object, average daily sales data of the preset object, number of days for preparation of the preset object, a display-on-shelf quantity of the preset object, and stocking inventory data of the preset object;
wherein the one or more processors are further configured to:
obtain sales data of the preset object in a historical time period from the warehousing data table; and
determine the average daily sales data of the preset object according to the sales data of the preset object in the historical time period;
determine sales data of the preset object in a first time period according to the arrival time length for the replenishment of the preset object, the replenishment cycle of the preset object, and the average daily sales data of the preset object, wherein the first time period is a sum of the arrival time length for the replenishment of the preset object and the replenishment cycle of the preset object;
determine the safety inventory data of the preset object according to the sales data of the preset object in the first time period, the arrival time length for the replenishment of the preset object, the average daily sales data of the preset object, the display-on-shelf quantity of the preset object, and the stocking inventory data of the preset object, wherein the safety inventory data of the preset object is a maximum safety inventory data of the preset object;
determine, according to store information corresponding to the preset object, whether the store information is in a preset list; and
stop, in response to that the store information is in the preset list, sending the replenishment quantity of the preset object to the warehouse management system.

5. The electronic device of claim 4, wherein the one or more processors are configured to:
determine the target inventory data of the preset object according to the average daily sales data of the preset object, the arrival time length for the replenishment of the preset object, the replenishment cycle of the preset object, and the number of days for preparation of the preset object.

6. The electronic device of claim 4, wherein the one or more processors are further configured to:
obtain an adjusted replenishment quantity of the preset object by adjusting the replenishment quantity of the preset object according to a minimum order quantity of the preset object; and
send the adjusted replenishment quantity of the preset object to the warehouse management system.

7. A non-transitory computer-readable medium storing a computer program thereon, wherein the computer program is used for, when executed by a processor, implementing a method for processing warehousing data comprising:
obtaining attribute data of a preset object from a warehousing data table;
determining safety inventory data of the preset object according to the attribute data of the preset object;
determining target inventory data of the preset object according to the attribute data of the preset object;
obtaining current inventory data of the preset object from the warehousing data table;
determining, in response to that the current inventory data of the preset object is less than or equal to the safety inventory data of the preset object, a replenishment quantity of the preset object according to the target inventory data of the preset object and the current inventory data of the preset object; and
sending the replenishment quantity of the preset object to a warehouse management system, causing the warehouse management system to perform replenishment according to the replenishment quantity of the preset object;
wherein the attribute data of the preset object comprises any one or more of following items: an arrival time length for the replenishment of the preset object, a replenishment cycle of the preset object, average daily sales data of the preset object, number of days for preparation of the preset object, a display-on-shelf quantity of the preset object, and stocking inventory data of the preset object;

the method further comprising:
obtaining, by the server, sales data of the preset object in a historical time period from the warehousing data table; and
determining, by the server, the average daily sales data of the preset object according to the sales data of the preset object in the historical time period;
determining, by the server according to store information corresponding to the preset object, whether the store information is in a preset list; and
stopping, by the server in response to that the store information is in the preset list, sending the replenishment quantity of the preset object to the warehouse management system;
wherein the determining, by the server, the safety inventory data of the preset object according to the attribute data of the preset object comprises:
determining, by the server, sales data of the preset object in a first time period according to the arrival time length for the replenishment of the preset object, the replenishment cycle of the preset object, and the average daily sales data of the preset object, wherein the first time period is a sum of the arrival time length for the replenishment of the preset object and the replenishment cycle of the preset object;
determining, by the server, the safety inventory data of the preset object according to the sales data of the preset object in the first time period, the arrival time length for the replenishment of the preset object, the average daily sales data of the preset object, the display-on-shelf quantity of the preset object, and the stocking inventory data of the preset object, wherein the safety inventory data of the preset object is a maximum safety inventory data of the preset object.

* * * * *